US011963113B2

(12) United States Patent
Manolakos et al.

(10) Patent No.: US 11,963,113 B2
(45) Date of Patent: Apr. 16, 2024

(54) ESTIMATING A TIMING FOR A NON-SERVING CELL OF A USER EQUIPMENT

(71) Applicant: QUALCOMM Incorporated, San Diego, CA (US)

(72) Inventors: Alexandros Manolakos, San Diego, CA (US); Hung Dinh Ly, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 16/922,795

(22) Filed: Jul. 7, 2020

(65) Prior Publication Data

US 2021/0045075 A1    Feb. 11, 2021

(30) Foreign Application Priority Data

Aug. 9, 2019 (GR) .............................. 20190100345

(51) Int. Cl.
*H04W 24/08* (2009.01)
*H04B 7/06* (2006.01)
*H04L 5/00* (2006.01)
*H04W 56/00* (2009.01)
(Continued)

(52) U.S. Cl.
CPC ........ *H04W 56/001* (2013.01); *H04B 7/0626* (2013.01); *H04L 5/0048* (2013.01); *H04W 24/08* (2013.01); *H04W 56/0045* (2013.01); *H04W 64/003* (2013.01); *H04W 76/27* (2018.02)

(58) Field of Classification Search
CPC . H04W 64/00; H04W 64/003; H04W 64/006; H04W 4/72; H04W 4/02; H04W 56/001; H04W 36/061; H04W 72/005; H04W 80/02; H04W 4/023; H04B 17/27; H04B 7/022

See application file for complete search history.

(56) References Cited

U.S. PATENT DOCUMENTS 6,167,275 A * 12/2000 Oros ..................... H04W 64/00
                                                        455/433
9,173,183 B1    10/2015 Ray et al.
9,363,782 B2     6/2016 Tenny
(Continued)

FOREIGN PATENT DOCUMENTS

CN        103313381 A      9/2013
CN        109474938 A      3/2019
(Continued)

OTHER PUBLICATIONS

International Search Report and Written Opinion—PCT/US2020/041227—ISAEPO—dated Nov. 11, 2020.
(Continued)

*Primary Examiner* — Jean A Gelin
(74) *Attorney, Agent, or Firm* — MG-IP Law, P.C.

(57) ABSTRACT

In an embodiment, a UE determines a timing for a serving cell, obtains a location of a non-serving cell, determines a location of the UE, and estimates a timing for the non-serving cell based at least in part on the timing for the serving cell, the location of the non-serving cell and the location of the UE.

47 Claims, 9 Drawing Sheets

(51) Int. Cl.
*H04W 64/00* (2009.01)
*H04W 76/27* (2018.01)

(56) References Cited

U.S. PATENT DOCUMENTS

| | | | | |
|---|---|---|---|---|
| 10,111,111 | B2* | 10/2018 | Yoo | H04W 56/00 |
| 2002/0094820 | A1* | 7/2002 | Keranen | G01S 5/14 |
| | | | | 342/450 |
| 2005/0221827 | A1* | 10/2005 | Natsume | H04W 36/0079 |
| | | | | 455/433 |
| 2005/0272425 | A1* | 12/2005 | Amerga | H04B 1/7083 |
| | | | | 455/67.11 |
| 2009/0137246 | A1* | 5/2009 | Xing | H04W 36/18 |
| | | | | 455/434 |
| 2010/0008412 | A1* | 1/2010 | Ito | H04B 1/707 |
| | | | | 375/232 |
| 2010/0039315 | A1* | 2/2010 | Malkos | G01S 5/0036 |
| | | | | 342/357.43 |
| 2010/0331013 | A1* | 12/2010 | Zhang | G01S 5/0242 |
| | | | | 455/456.2 |
| 2011/0312339 | A1* | 12/2011 | Kuningas | G01S 5/0236 |
| | | | | 455/456.1 |
| 2012/0020310 | A1* | 1/2012 | Ji | H04W 48/16 |
| | | | | 370/328 |
| 2012/0108270 | A1 | 5/2012 | Kazmi et al. | |
| 2012/0163484 | A1* | 6/2012 | Wild | H04L 25/0242 |
| | | | | 375/260 |
| 2012/0190373 | A1* | 7/2012 | Tenny | H04W 56/0015 |
| | | | | 455/447 |
| 2013/0203447 | A1* | 8/2013 | Hannan | G01S 5/0205 |
| | | | | 455/456.5 |
| 2015/0018010 | A1* | 1/2015 | Fischer | H04W 76/28 |
| | | | | 455/456.2 |
| 2015/0257120 | A1* | 9/2015 | Prechner | G01S 5/0236 |
| | | | | 455/456.1 |
| 2015/0304810 | A1* | 10/2015 | Jalali | H04W 56/001 |
| | | | | 370/336 |
| 2016/0295536 | A1* | 10/2016 | Alriksson | H04W 56/003 |
| 2018/0376438 | A1* | 12/2018 | Islam | H04W 72/046 |
| 2019/0053013 | A1* | 2/2019 | Markhovsky | G01S 5/10 |
| 2019/0230475 | A1* | 7/2019 | Edge | H04W 64/00 |
| 2020/0142023 | A1* | 5/2020 | Markhovsky | G01S 13/74 |
| 2020/0322095 | A1* | 10/2020 | Park | H04L 1/1822 |
| 2020/0359375 | A1* | 11/2020 | Hwang | H04W 72/0446 |
| 2020/0367193 | A1* | 11/2020 | Cha | H04W 64/00 |
| 2020/0374806 | A1* | 11/2020 | Manolakos | G01S 5/0205 |
| 2021/0149009 | A1* | 5/2021 | Modarres Razavi | H04W 64/003 |

FOREIGN PATENT DOCUMENTS

| | | |
|---|---|---|
| CN | 109844558 A | 6/2019 |
| WO | 2010104451 A1 | 9/2010 |
| WO | WO-2012178016 A1 | 12/2012 |
| WO | 2019212224 A1 | 11/2019 |

OTHER PUBLICATIONS

Qualcomm Incorporated: "Summary of Offline Discussion#40: CR to Capture UseServingCellTimingForSync and assocatedSSB", 3GPP Draft, 3GPP TSG-RAN WG2 Meeting #102, R2-1809139-Offline#40—Summary of Offline Discussion#40: CR to Capture UseServingCellTimingForSync and assocatedSSB, 3rd Generation Partnership Project (3GPP), Mobile Competence Centre, 650, Route Des, vol. RAN WG2, No. Busan, Korea, May 21, 2018-May 25, 2018, May 25, 2018 (May 25, 2018), XP051503580, pp. 1-12, Retrieved from the Internet: URL: http://www.3gpp.org/ftp/tsg%5Fran/WG2%5FRL2/TSGR2%5F102/Docs/R2%2D1809139%2Ezip, [retrieved on May 25, 2018], the whole document.

* cited by examiner

ESTIMATING A TIMING FOR A NON-SERVING CELL OF A USER EQUIPMENT

CROSS-REFERENCE TO RELATED APPLICATION

The present application for patent claims priority under 35 U.S.C. § 119 to Greek Patent Application No. 20190100345, entitled "ESTIMATING A TIMING FOR A NON-SERVING CELL OF A USER EQUIPMENT", filed with the Greek Patent and Trademark Office on Aug. 9, 2019, and assigned to the assignee hereof and hereby expressly incorporated herein by reference in its entirety.

TECHNICAL FIELD

Various aspects described herein generally relate to estimating a timing of a non-serving cell of a user equipment (UE).

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station). The mobile device may also transmit its own ranging signal(s) that are measured by the two or more network nodes, either as part of a separate positioning procedure or to facilitate calculation of round trip propagation time (RTT) between the mobile device and the two or more network nodes.

SUMMARY

An embodiment is directed to a method of method of operating a user equipment (UE), comprising determining a timing for a serving cell, obtaining a location of a non-serving cell, determining a location of the UE, and estimating a timing for the non-serving cell based at least in part on the timing for the serving cell, the location of the non-serving cell and the location of the UE.

Another embodiment is directed to a user equipment (UE), comprising a memory, at least one transceiver, and at least one processor coupled to the memory and the at least one transceiver and configured to determine a timing for a serving cell, obtain a location of a non-serving cell, determine a location of the UE, and estimate a timing for the non-serving cell based at least in part on the timing for the serving cell, the location of the non-serving cell and the location of the UE.

Another embodiment is directed to a user equipment (UE), comprising means for determining a timing for a serving cell, means for obtaining a location of a non-serving cell, means for determining a location of the UE, and means for estimating a timing for the non-serving cell based at least in part on the timing for the serving cell, the location of the non-serving cell and the location of the UE.

Another embodiment is directed to a non-transitory computer-readable medium containing instructions stored thereon, which, when executed by a user equipment (UE), cause the UE to perform actions, the instructions comprising at least one instruction to cause the UE to determine a timing for a serving cell, at least one instruction to cause the UE to obtain a location of a non-serving cell, at least one instruction to cause the UE to determine a location of the UE, and at least one instruction to cause the UE to estimate a timing for the non-serving cell based at least in part on the timing for the serving cell, the location of the non-serving cell and the location of the UE.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
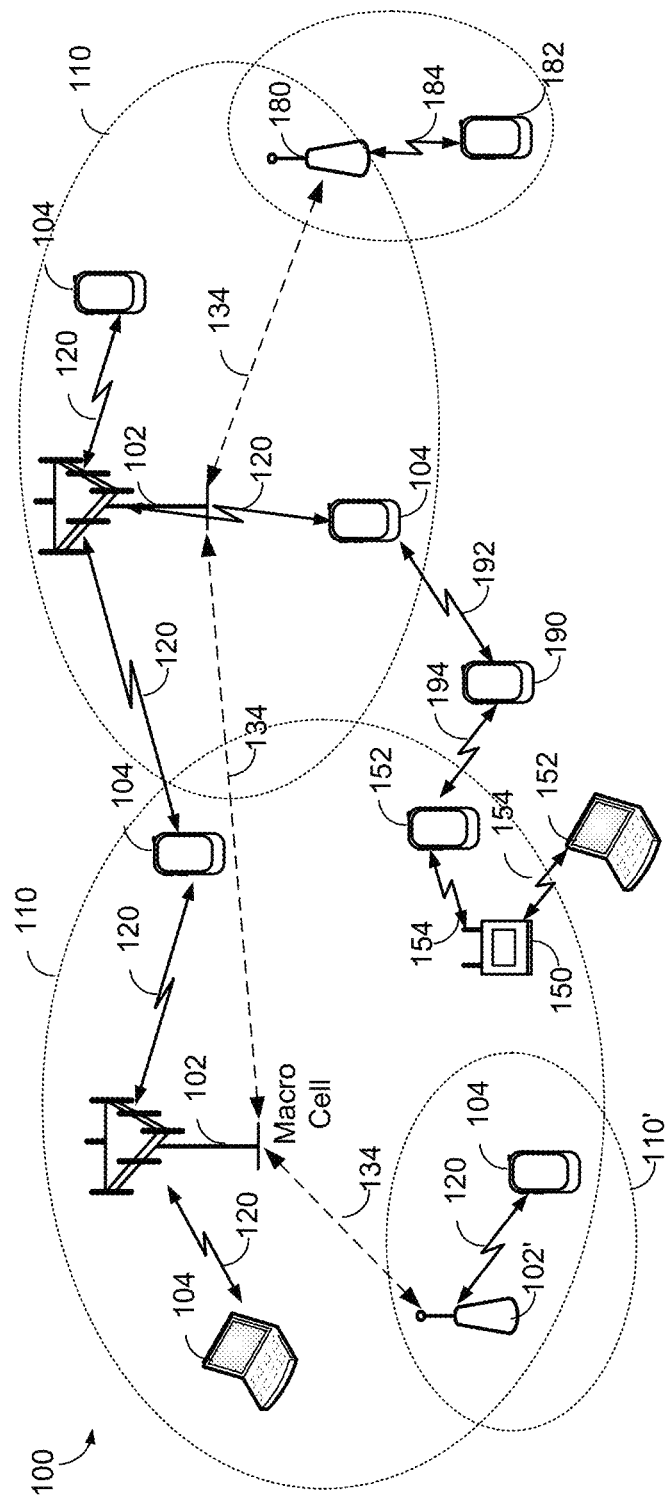
FIG. 1 illustrates an exemplary wireless communications system, according to various aspects.

Various aspects described herein generally relate to estimating a timing of a non-serving cell of a user equipment (UE).

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
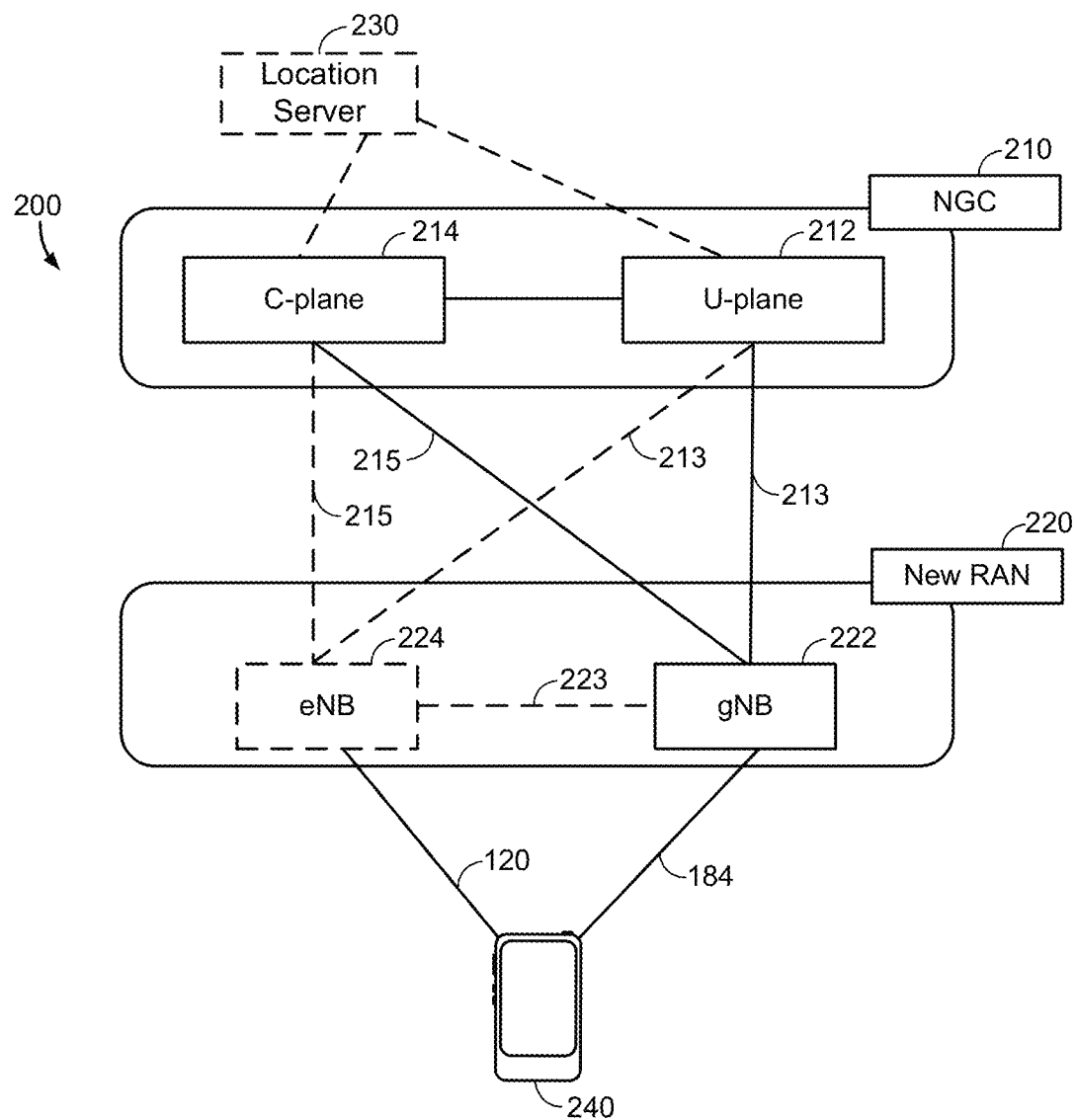
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.), and user plane functions 212 (e.g., UE gateway function, access to data networks, Internet protocol (IP) routing, etc.), which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 152, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
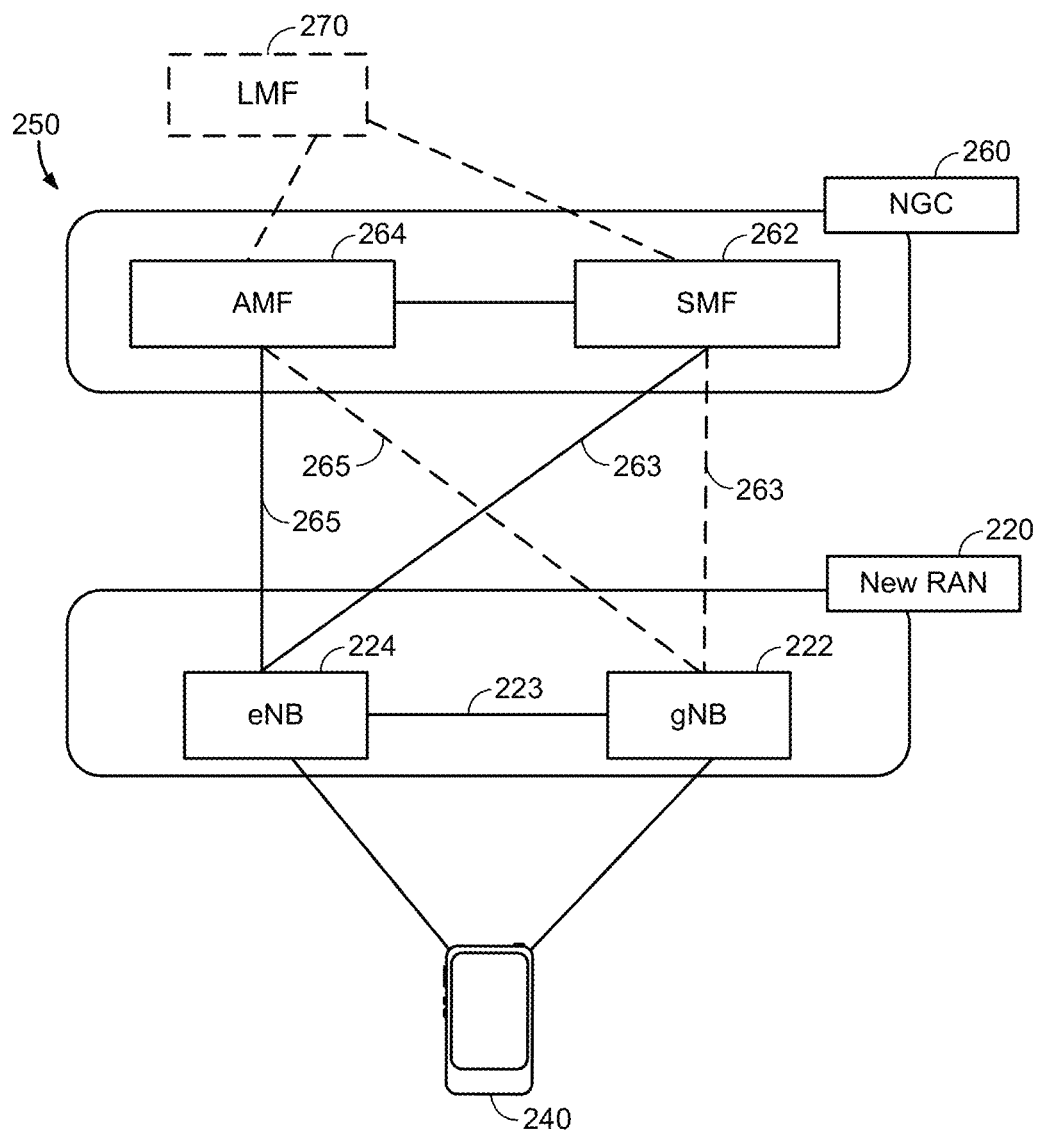

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 240. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 240 that can connect to the LMF 270 via the core network, NGC 260, and/or via the Internet (not illustrated).

Figure 3A:
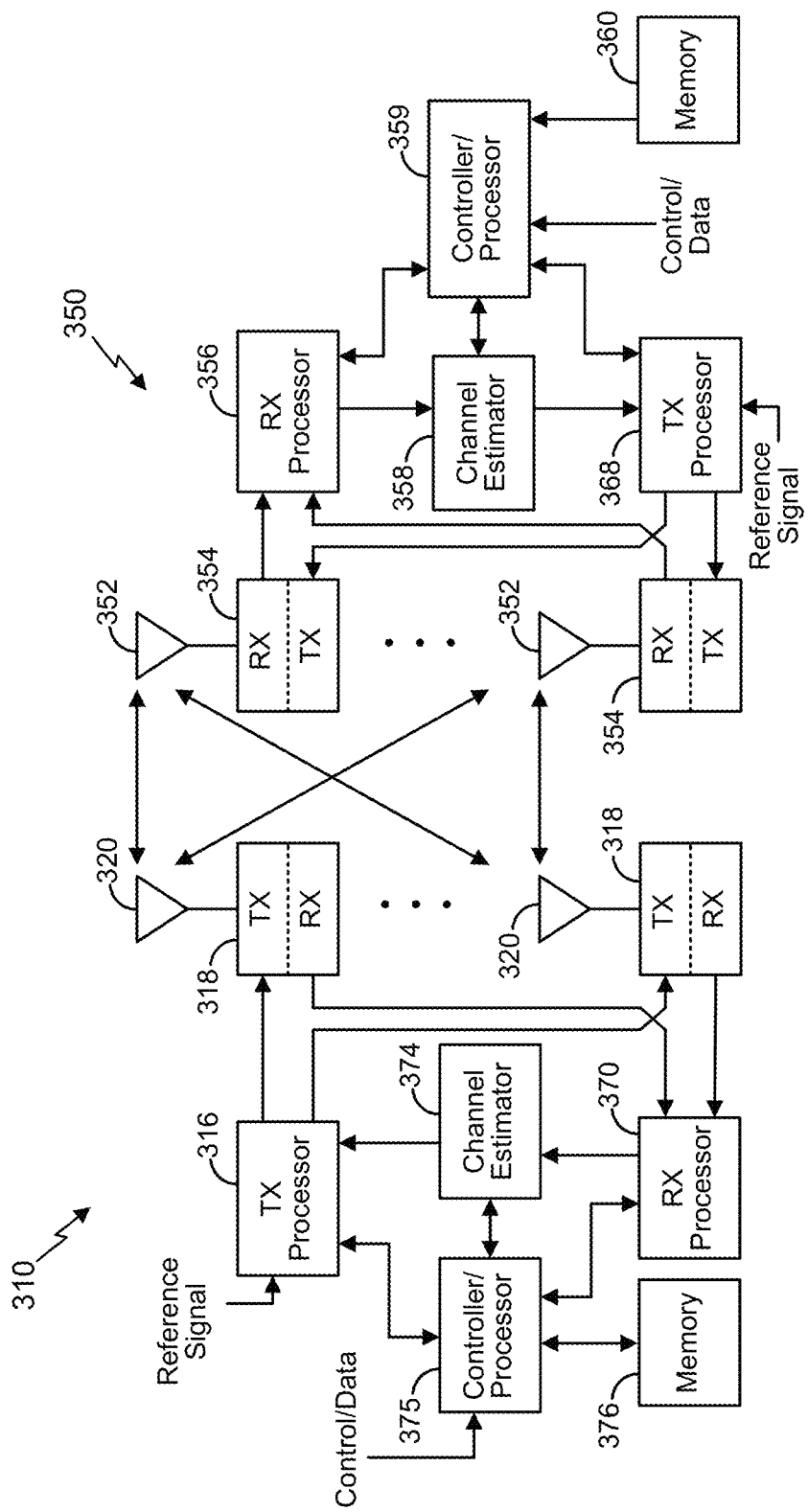
FIG. 3A illustrates an exemplary base station and an exemplary user equipment (UE) in an access network, according to various aspects.

According to various aspects, FIG. 3A illustrates an exemplary base station (BS) 310 (e.g., an eNB, a gNB, a small cell AP, a WLAN AP, etc.) in communication with an exemplary UE 350 (e.g., any of the UEs depicted in FIG. 1, such as UEs 104, UE 152, UE 182, UE 190, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency-division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the processing system 359, which implements Layer-3 and Layer-2 functionality.

The processing system 359 can be associated with a memory 360 that stores program codes and data. The memory 360 may be referred to as a non-transitory computer-readable medium. In the UL, the processing system 359 provides demultiplexing between transport and logical channels, packet reassembly, deciphering, header decompression, and control signal processing to recover IP packets from the core network. The processing system 359 is also responsible for error detection.

Similar to the functionality described in connection with the DL transmission by the base station 310, the processing system 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission. In an aspect, the transmitters 354b and the receivers 354a may be one or more transceivers, one or more discrete transmitters, one or more discrete receivers, or any combination thereof.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to a RX processor 370. In an aspect, the transmitters 318a and the receivers 318b may be one or more transceivers, one or more discrete transmitters, one or more discrete receivers, or any combination thereof.

The processing system 375 can be associated with a memory 376 that stores program codes and data. The memory 376 may be referred to as a non-transitory computer-readable medium. In the UL, the processing system 375 provides demultiplexing between transport and logical channels, packet reassembly, deciphering, header decompression, control signal processing to recover IP packets from the UE 350. IP packets from the processing system 375 may be provided to the core network. The processing system 375 is also responsible for error detection.

The various components of the BS 310 and UE 350 of FIG. 3A are communicatively coupled to each other. In some designs, some or all of the inter-component communicative coupling may be implemented may be wired coupling (e.g., via an electrical or optical bus), while in other designs some or all of the inter-component communicative coupling may be implemented wirelessly.

Figure 3B:
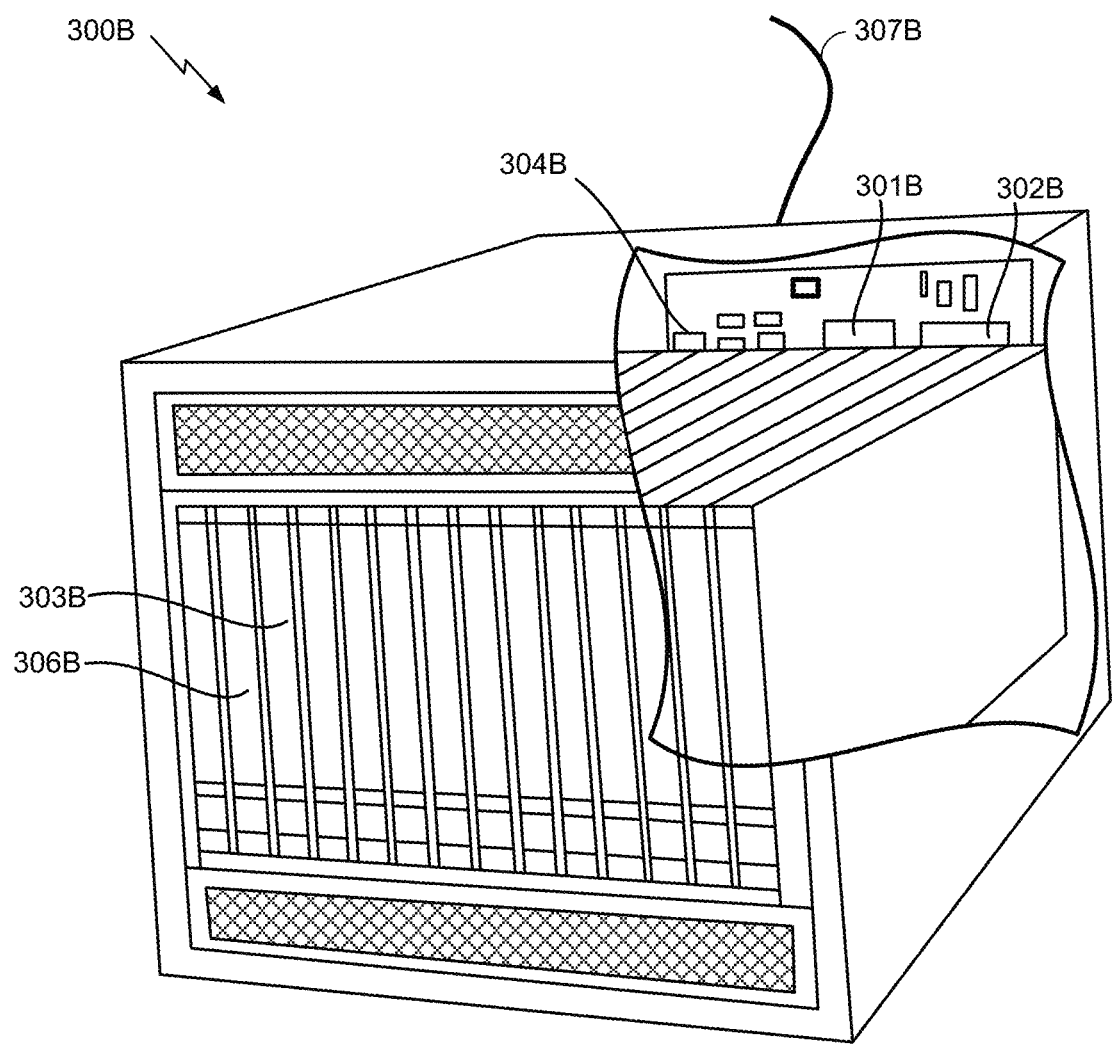
FIG. 3B illustrates an exemplary server according to various aspects.

FIG. 3B illustrates an exemplary server 300B. In an example, the server 300B may correspond to one example configuration of the location server 230 described above. In FIG. 3B, the server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
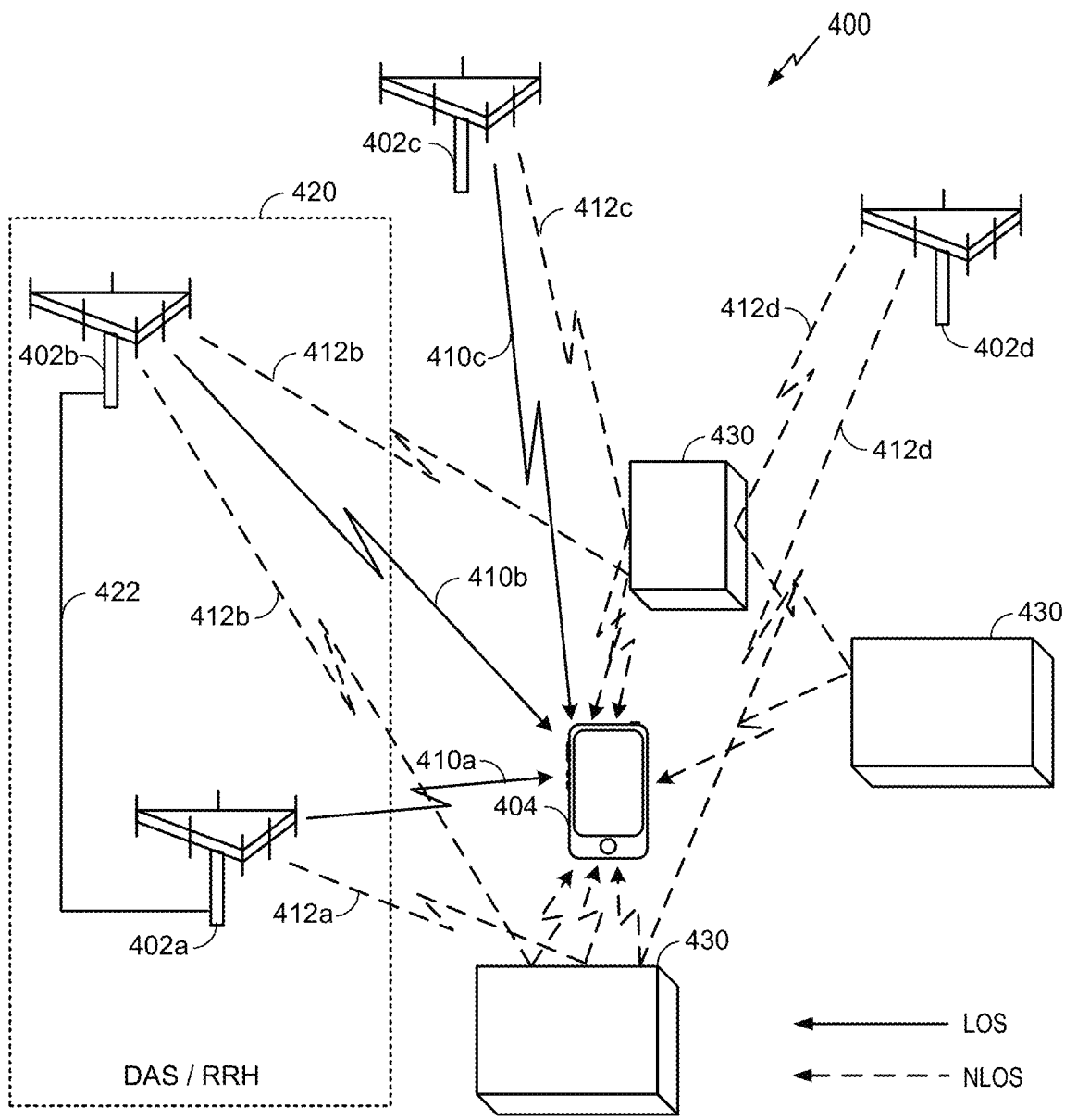
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beam.

While FIG. 4 is described in terms of transmissions from a base station to a UE, it will be appreciated that the downlink RF signal paths described with respect to FIG. 4 are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

OTDOA is a downlink positioning methodology introduced in LTE Rel. 9. OTDOA is a multilateration methodology in which a UE measures the time of arrival (TOA) of signals received from multiple base stations (or eNodeBs). The TOAs of Cell-specific Reference Signals (CRSs) from several neighboring base stations or cells (e.g., eNodeBs) are subtracted from a TOA of a Positioning Reference Signal (PRS) of a reference base station or cell (e.g., eNodeB) to form OTDOAs. In an example, PRSs may be periodically transmitted by base stations or cells (e.g., during positioning occasions that occur aperiodically or at a certain periodicity or interval) and may be implemented as pseudo-random Quadrature Phase Shift Keying (QPSK) sequences that are mapped in diagonal patterns with shifts in frequency and time to avoid collision with cell-specific reference signals. Geometrically, each time (or range) difference determines a hyperbola, and the point at which these hyperbolas intersect is the estimated UE location.

The measurement made by the UE for OTDOA positioning is the Reference Signal Time Difference (RSTD) measurement. The RSTD is the relative timing difference between two cells; namely, the reference cell and a measured neighboring cell. The RSTD measurement is possible on an intra-frequency cell and on an inter-frequency cell. The OTDOA-based may also be implemented in the uplink direction, which is referred to as uplink TDOA (U-TDOA).

In 5G NR, the CSI-RS can be used for different purposes. For example, a first CSI-RS type can be used for L3 (i.e., protocol stack layer 3) mobility, and a second CSI-RS type can be used for beam management (e.g., beam-specific radio resource management (RRM)). Different CSI-RS types may different in various ways, including which cells transmit the CSI-RS types and/or information that is indexed to particular CSI-RS types (e.g., whether a particular CSI-RS is associated with a cell ID from which a location can be derived).

In some designs, the CSI-RS for L3 mobility can have the same, partially the same, or different CSI-RS configuration relative to the CSI-RS configuration used for the CSI-RS for beam management. In some designs, the CSI-RS configuration can be established via dedicated RRC signaling, and can be used to support CSI-RS measurements for a large number of beams. A timing synchronization reference refers to the frame, slot, and/or symbol timing of a cell (referred to herein as the "timing" of the associated cell). In some designs, the timing of a cell can be obtained from a Synchronization Signal Block (SSB) obtained for that cell.

In NR 5G, a cell ID for a time reference of CSI-RS(s) is conveyed to the UE. In some designs, the UE is not required to measure CSI-RS configured for L3 mobility outside of "active time", whereby the active time refers to the time when the UE is monitoring PDCCH in onDuration or due to any timer triggered by gNB activity, e.g., when any of 'onDurationTimer', 'drx-InactitivityTimer' or ' drx-RetransmissionTimer' is running.

In some designs, the CSI-RS for L3 mobility uses the same sequence design as the CSI-RS for beam management. With regard to RRM measurements of CSI-RSs for L3 mobility, a CSI-RS sequence seed to generate a CSI-RS sequence is configured on a UE-specific basis UE. In some designs, 1-port CSI-RS resources for beam management are re-used for CSI-RS for L3 mobility. In some designs, values of D for CSI-RS for beam management are re-used for CSI-RS for L3 mobility. In some designs, for a particular cell, all CSI-RS resources for L3 mobility may be confined to designated slots. Table 1 depicts various parameters for a particular CSI-RS configuration:

TABLE 1

CSI-RS Configuration

| Parameter Name | Description | Candidate values | Commonality of configured value(s) across multiple resources |
|---|---|---|---|
| Cell_ID | Physical Cell ID for CSI-RS | 0, 1, . . . , 1007 | Common value is assigned across all the resources configured for a cell |

TABLE 1-continued

CSI-RS Configuration

| Parameter Name | Description | Candidate values | Commonality of configured value(s) across multiple resources |
|---|---|---|---|
| slotConfig | Contains periodicity and slot offset for periodic/semi-persistent CSI-RS FFS slot offset details (no additional RRC impact) | Periodicity: {5, 10, 20, 40} msec Offset: 0, 1, . . . , P-1 slots, where periodicity P is in terms of slots in the CSI-RS numerology | Configured per resource |
| Sequence-Generation | Sequence generation parameter for CSI-RS, i.e., scrambling ID | 0-1023 | Configured per resource |
| Common-PRB-Grid-offset | Information to define common PRB grid for CSI-RS sequence generation Corresponds to an offset (in terms of number of subcarriers in CSI-RS numerology) between PRB 0 for common PRB indexing and a reference location (i.e., corresponds to RRC parameter DL-BWP-loc defined for BWP) - the reference location is the lowest PRB of the cell-defining SSB | [0, 1, 2, . . . , >276*4] | A common value is assigned across all the resources configured for per cell |
| Measurement-BW | Allowed measurement BW for CSI-RS | BW size: {24, 48, 96, 192, 268} PRBs in CSI-RS numerology Starting PRB index: {0, 1, . . . , [251](=274 − 24 + 1)]} PRBs with respect to PRB0 in CSI-RS numerology | A common set of values are assigned across all the resources configured per cell |
| Carrier-info | Provides frequency location information for inter-frequency measurement | Absolute frequency value, RAN2 to fill in, if not provided elsewhere | A common value is assigned across all the resources configured for a frequency carrier |
| RE-Mapping-Pattern | RE mapping pattern for a CSI-RS resource | Adopt the parameter values agreed in BM | Configured per resource |
| Density | Frequency domain density for the 1-port CSI-RS | {1, 3} | A common value is assigned across all the resources configured per cell |
| Numerology | Numerology for CSI-RS | {15, 30, 60} for sub6 GHz {60, 120, 240} for over6 GHz | A common value is assigned across all the resources configured per frequency carrier |
| Associated-SSB | For each CSI-RS resource, at most one associated SSB can be configured Note: If the associated-SSB is signaled, UE is not required to monitor CSI-RS resource(s) when the UE cannot detect the associated SSB | {0, 1, . . . , L-1} | Configured per resource This field is optional per frequency layer |
| QCLed-SSB | The CSI-RS resource is either QCL'ed not QCL'ed with the associated SSB in spatial parameters | {yes, no} | Configured per resource This field is conditionally indicated if associated-SSB is configured |

In certain 5G NR protocols, the associatedSSB parameter operates as follows:

associatedSSB: If this field is present, the UE may base the timing of the CSI-RS resource indicated in CSI-RS-Resource-Mobility on the timing of the cell indicated by the cellId in the CSI-RS-CellMobility. In this case, the UE is not required to monitor that CSI-RS resource if the UE cannot detect the SS/PBCH block indicated by this associatedSSB and cellId. If this field is absent, the UE shall base the timing of the CSI-RS resource indicated in CSI-RS-Resource-Mobility on the timing of the serving cell indicated by refServCellIndex. In this case, the UE is required to measure the CSI-RS resource even if SS/PBCH block(s) with cellId in the CSI-RS-CellMobility are not detected. CSI-RS resources with and without associatedSSB may be configured in accordance with the rules in TS 38.214 [19], clause 5.1.6.1.3.

In certain 5G NR protocols, the refServCellIndex parameter operates as follows:

refServCellIndex: Indicates the serving cell providing the timing reference for CSI-RS resources without associatedSSB. The field may be present only if there is at least one CSI-RS resource configured without associatedSSB. In case there is at least one CSI-RS resource configured without associatedSSB and this field is absent, the UE shall use the timing of the PCell. The CSI-RS resources and the serving cell indicated by refServCellIndex for timing reference should be located in the same band.

In 5G NR systems operating in accordance with the rules noted above, timing to a non-serving cell may not be optimized in scenarios (i) where the UE is not configured with associatedSSB, or (ii) where the UE is configured with associatedSSB but cannot detect associatedSSB. In one example in case of (i), a timing to a neighboring or non-serving cell (e.g., gNB) may be up to 3 microseconds earlier or later than the true timing (e.g., such that CSI-RS processing is not optimized). In one example in case of (ii), the UE may not process a timing to a neighboring or non-serving cell (e.g., gNB) at all.

Embodiments of the present disclosure are related to estimating a timing of a non-serving cell. In some aspects, the timing of the non-serving cell can be estimated in the above-noted scenarios where a UE is either not configured with associatedSSB or cannot detect associatedSSB, but the embodiments described herein are not limited to such scenarios.

Figure 5:
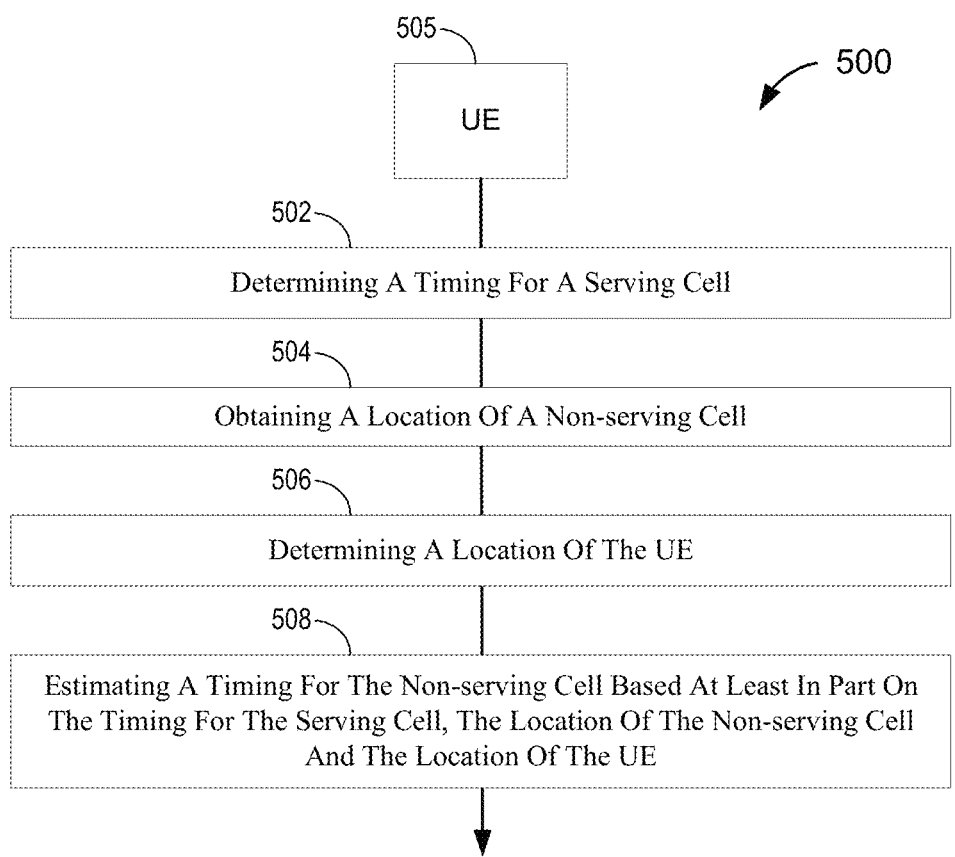
FIG. 5 illustrates an exemplary process 500 of estimating a timing of a non-serving cell according to an aspect of the disclosure.

FIG. 5 illustrates an exemplary process 500 of estimating a timing of a non-serving cell according to an aspect of the disclosure. The process 500 of FIG. 5 is performed by a UE 505, which may correspond to any of the above-noted UEs (e.g., UE 240, 350, etc.).

At 502, the UE 505 (e.g., controller/processor 359, etc.) determines a timing for a serving cell (e.g., a Pcell, such as a gNB, that is serving the U3 505). At 504, the UE 505 (e.g., controller/processor 359, etc.) obtains a location of a non-serving cell. The location can be obtained at 504 either by dynamic determination at the UE, or alternatively by location information conveyed to the UE from an external source. For example, in a UE-based positioning procedure, the UE 505 would have knowledge of the locations of at least those cells involved with the UE-based positioning procedure. In this case, the UE 505 can leverage the knowledge of these non-serving cell(s) to obtain the location at 504 in association with timing estimation to one or more of those non-serving cell(s). In some designs, the location of the non-serving cell is obtained at 504 based at least in part on information received at the UE (e.g., positioning assistance information received in association with a UE-based positioning procedure). In an example, the UE-based positioning procedure may be performed based on various parameters, including but not limited to Observed Time Difference Of Arrival (OTDOA) measurements, multi-cell Round Trip Time (RTT) measurements, Angle of Arrival (AoA) or Angle of Departure (AoD) measurements, enhanced Cell ID with beamforming, to name a few. In other designs, the positioning assistance information can be conveyed to the UE 505 outside of a UE-based positioning procedure (e.g., in response to a UE-initiated request for the positioning assistance information, or every time the UE is in a new area, the UE may obtain or be provided with assistance data in that area to assist in a future a positioning procedure, etc.). Various methodologies by which the UE 505 can ascertain a physical location of the non-serving cell will now be described.

In some designs, a group of cells participating in a UE-specific RRM (beam management) procedures is different than a group of cells participating in a UE-specific positioning procedure. The positions (or physical locations) of the cells participating in the UE-specific positioning procedure is known to the UE, whereas the positions (or physical locations) of the cells participating in the UE-specific RRM procedures are not necessarily known to the UE. In this case, signaling can be implemented such that the UE can correlate (or map) the cells participating in the UE-specific RRM procedures with their respective locations.

In a first example, the UE can be configured with an actual physical location of one or more non-serving cells via an RRC configuration of the CSI-RS for RRM (or beam management). For example, the RRC configuration "csi-RS-CellList-Mobility" has a list of cells, and this list can be further enhanced with a list of corresponding physical locations. For example, in 5G NR, a Location Management Function (LMF) is aware of the gNB locations, and the serving cell is aware of the cell-IDs of the non-serving cells participating in the RRM procedure. So, through NR Positioning Protocol A (NRPPa), the LMF forwards the locations to the serving cell, and then the serving cell forwards those that are participating in the RRM (e.g., a subset of gNBs) to the UE through RRC configuration (e.g., via an Information Element of a RRC configuration message).

In a second example, the cell ID used in the RRM procedure for a particular cell can be different than the cell ID used in the position estimation procedure for that same cell (e.g., because the number of cells in the respective procedures is different and the RRM/positioning procedures operate independently such that syncing of cell IDs between the procedures is difficult). In this case, UE can be configured in a Location Positioning Protocol (LPP) configuration (e.g., via an Information Element of an LPP configuration message). with a mapping between the cell IDs used in the RRM procedure to the cell IDs used in the position estimation procedure. In one example, the UE is configured with a higher layer message (e.g., together with the PRS configurations), of a mapping between the gNBs participating in the positioning procedure and the RRM procedure.

In one example implementation of a mapping of cell ID(s) to physical location(s) in accordance with either the first or second example noted above, an IE may comprise a list containing tuples of cell-IDs with corresponding physical locations may. In some designs, the cell-IDs may be 10 bits long. Examples of how the physical locations can be indicated in the IE are as follows:

TABLE 2

| | Physical Location Characterization |
|---|---|
| Alternative #1 | EllipsoidPointWithAltitudeAndUncertaintyEllipsoid (same as in NRPPa):<br>Latitude resolution 90/223 ~1.1 × 10–5 degrees; e.g., corresponds to about 1.2 m;<br>Longitude resolution 360/224 ~2 × 10–5 degrees; e.g., corresponds to about <2.4 m;<br>Altitude resolution is 1 m |
| Alternative #2 | HighAccuracyEllipsoidPointWithAltitudeAndUncertaintyEllipsoid:<br>Allows resolution of ~5 millimeters for latitude, and less than ~10 millimeters for longitude;<br>2-7 m resolution for altitude |

In a third example, an explicit association between a PRS resource configured in the LPP and a RRM resource configured in RRC (e.g., via an Information Element of a RRC configuration message) is conveyed to the UE. In some designs, the explicit association can be conveyed to the UE via RRC. In other designs, the explicit association can be conveyed to the UE via LPP (e.g., via an Information Element of an LPP configuration message). In some designs, the IE indicating the explicit association may comprise a list of tuples where each tuple contains a <PRS resource ID> of the LPP and a <PRS resource ID> of the CSIRS for RRM (exists in 331 CSI-RS-ResourceConfigMobility). In some designs, the bits for the CSIRS for RRM are 7 bits (e.g., there are up to 96 CSIRS for RRM for each CC maxN-rofCSI-RS-ResourcesRRM=96).

In a fourth example, an implicit association between a PRS resource configured in the LPP and a RRM resource configured in RRC is conveyed to the UE (e.g., via an Information Element of a RRC configuration message). In one example, a PRS resource and RRM resource are configured with a scrambling code. Each PRS resource is associated with a location known to the UE. In this case, the RRM resource associated with the same cell as a PRS can be configured with the same respective scrambling code. The UE then knows to associate a RRM resource using the same scrambling code as a PRS resource with the physical location associated with that PRS resource.

Figure 6A:
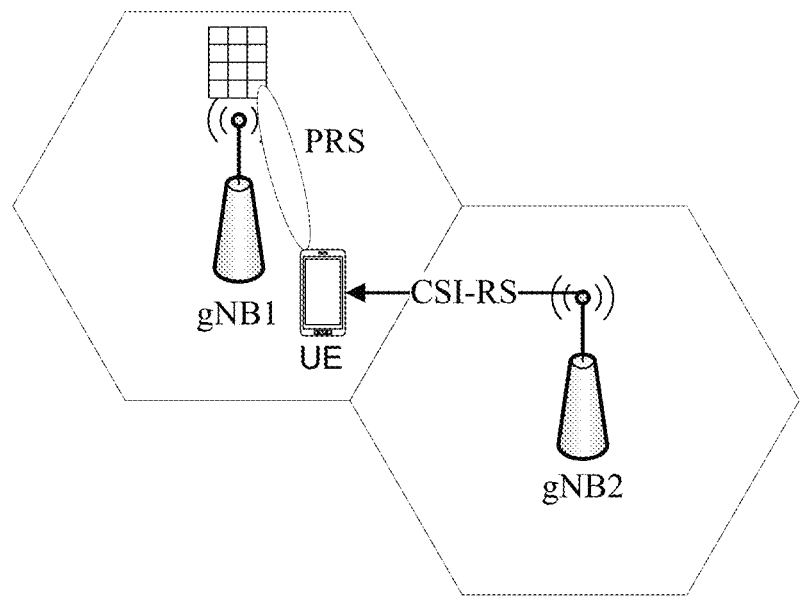
FIG. 6A depicts a UE-based positioning procedure whereby the locations of gNB1 and gNB2 are known to the UE, and an angle and delay estimate of a CSI-RS from gNB2 (serving cell) can be used at the UE to derive the UE location.
Figure 6B:
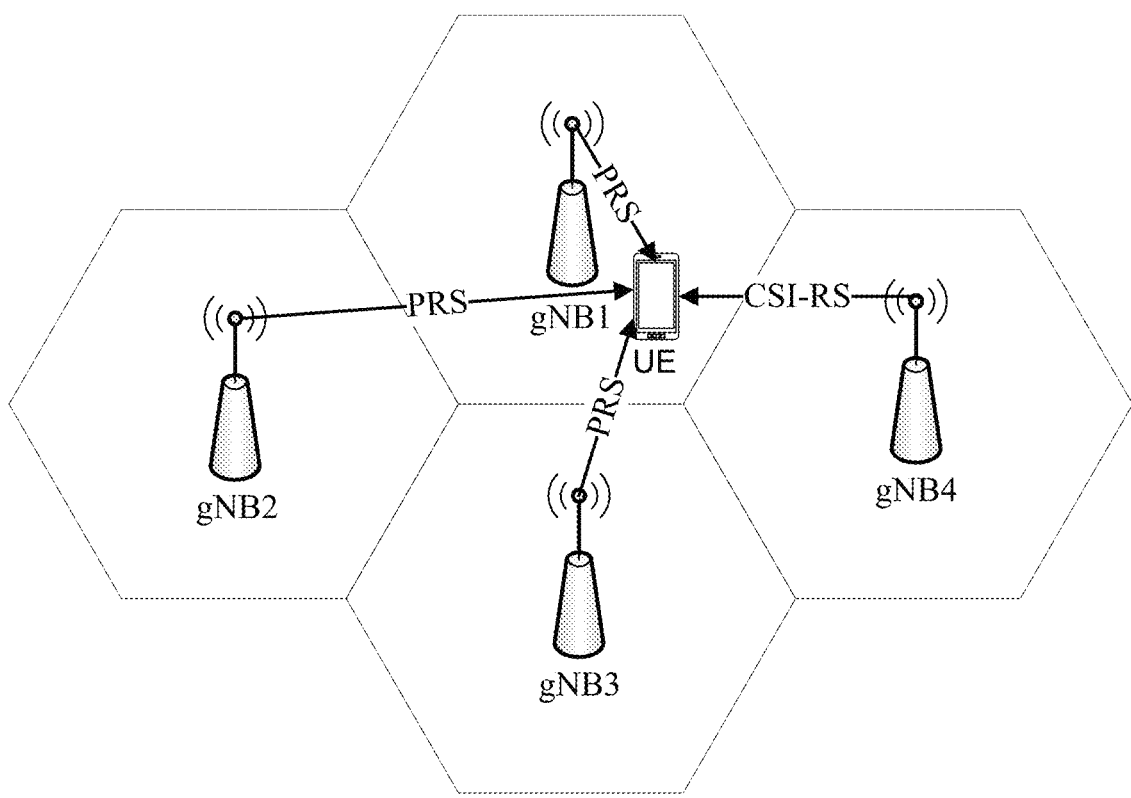
FIG. 6B depicts a UE-based positioning procedure whereby the locations of gNB1 through gNB4 are known to the UE, and PRSs from gNB1 through gNB4 can be used at the UE to derive the UE location.

Returning to FIG. 5, at 506, the UE 505 (e.g., controller/processor 359, etc.) determines a location of the UE. In some designs, the determination of the UE location at 506 can be obtained based on an angle and delay estimate from a serving cell, as shown in FIG. 6A. In FIG. 6A, assuming that the locations of gNB1 and gNB2 are known to the UE, an angle and delay estimate of a CSI-RS from gNB2 (serving cell) can be used at the UE to derive the UE location. In other designs, the determination of the UE location at 506 can be obtained based signals from multiple cells, as shown in FIG. 6B. In FIG. 6B, assuming that the locations of gNB1 through gNB4 are known to the UE, PRSs from gNB1 through gNB4 can be used at the UE to derive the UE location.

At 508, the UE 505 (e.g., controller/processor 359, etc.) estimates a timing for the non-serving cell based at least in part on the timing for the serving cell, the location of the non-serving cell and the location of the UE. In one example, the estimation of the non-serving cell timing at 508 can be calculated as an offset from the timing of the serving cell which is determined earlier at 502. For example, the UE 505 may calculate a difference between (i) a propagation delay between the UE and the serving cell, and (ii) a propagation delay between the UE and the non-serving cell. This calculated difference can then be used as a timing offset to the timing of the serving cell so as to estimate the timing of the non-serving cell. In some scenarios as noted above, the resultant estimated timing of the non-serving cell may be more accurate than other available timing methodologies, which results in improved measurements of signals from the non-serving cell, such as measurements of CSI-RS for RRC or beam management (e.g., resulting in more accurate position location determinations, beam management or RRM, etc.) and/or other benefits.

Figure 7:
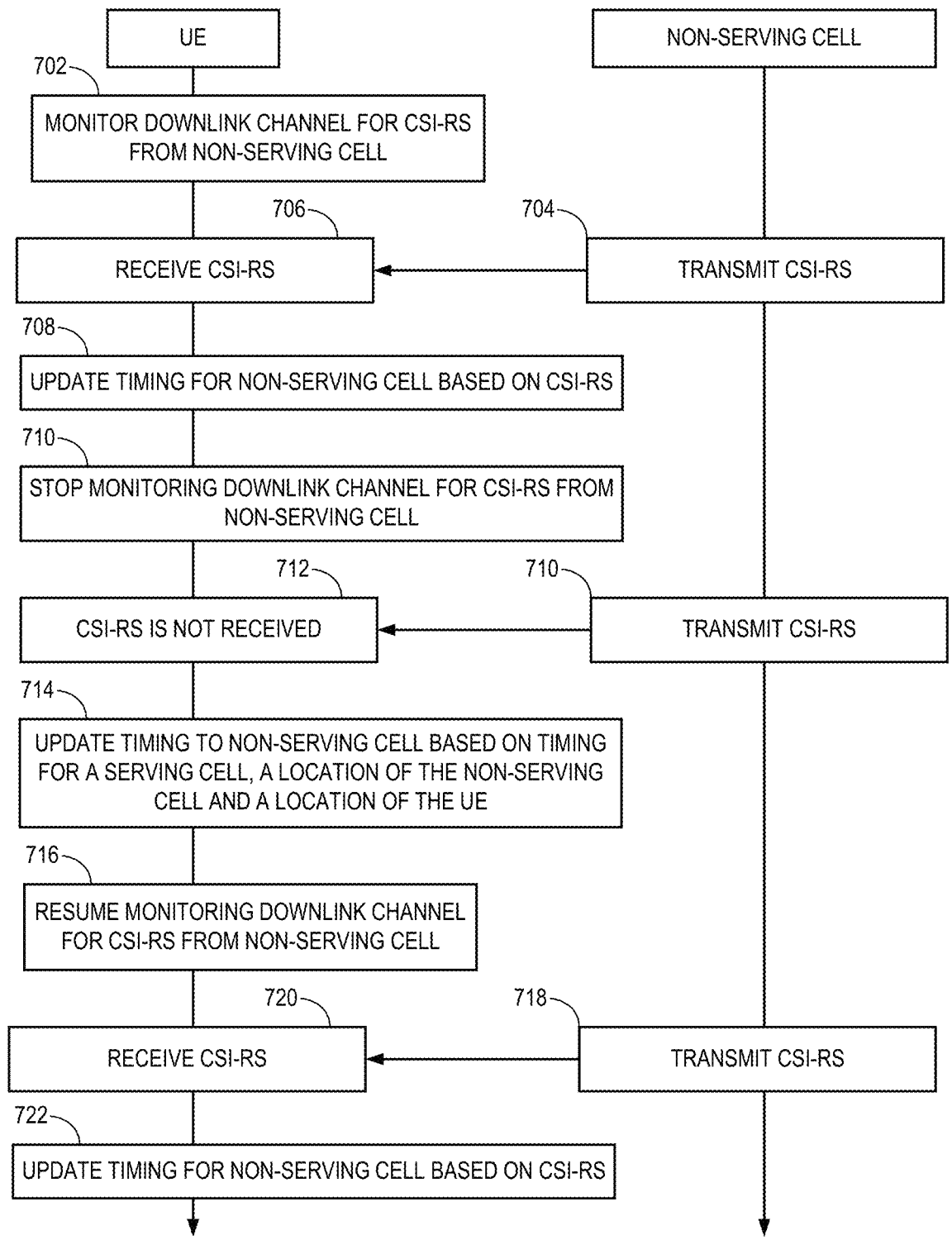
FIG. 7 illustrates an example implementation of the process of FIG. 5 in accordance with an embodiment of the disclosure.

FIG. 7 illustrates an example implementation of the process of 500 of FIG. 5 in accordance with an embodiment of the disclosure. At 702, a UE monitors a downlink channel for a CSI-RS from a non-serving cell. In an example, the monitoring of 702 may occur with respect to CSI-RS for L3 mobility and may occur during active time (e.g., when UE is monitoring PDCCH in onDuration or due to any timer triggered by gNB activity, i.e., when any of 'onDuration-Timer', 'drx-InactitivityTimer' or ' drx-Retransmission-Timer' is running). In another example, the monitoring of 702 may occur while the UE is configured with (and can detect) associatedSSB. At 704, the non-serving cell transmits a CSI-RS, which is received (or decoded) by the UE at 706. At 708, the UE updates a timing for the non-serving cell based on the CSI-RS received at 706.

At 710, a UE stops monitoring the downlink channel for the CSI-RS from the non-serving cell. In an example, the monitoring cessation of 710 occurs based on the UE being outside of active time. In another example, the monitoring cessation of 710 can occur based on UE either not being configured with associatedSSB or not being able the embodiments described herein are not limited to such scenarios. At 712, the non-serving cell transmits a CSI-RS, which is not received (or decoded) by the UE at 714. At 714 (e.g., as in 508 of FIG. 5), instead of permitting the timing to the non-serving cell to drift, the UE instead updates (or estimates) the timing to the non-serving cell based on a timing for a serving cell (not shown), a location of the non-serving cell and a location of the UE. In some designs, 714 may include a number of executions of the process 500 of FIG. 5 that continue so long as the UE is not monitoring the downlink channel for CSI-RSs from the non-serving cell.

At 716, the UE resumes monitoring of the downlink channel for CSI-RSs from the non-serving cell. In an example, the monitoring resumption at 716 may be triggered by the UE resuming active time (e.g., when the UE resumes monitoring PDCCH in onDuration or due to any timer triggered by gNB activity, i.e., when any of 'onDuration-Timer', 'drx-InactitivityTimer' or ' drx-Retransmission- Timer' is running). In another example, the monitoring resumption of 716 may occur while the UE is configured with (and can detect) associatedSSB. At 718, the non-serving cell transmits a CSI-RS, which is received (or decoded) by the UE at 720. At 722, the UE updates a timing for the non-serving cell based on the CSI-RS received at 720.

In further designs, the various operations described above with respect to FIG. 5 may be implemented via various "means", such as particular hardware components of the associated UEs 505. For example, means for performing the determining, obtaining, and estimating aspects of 502, 504, 506 and 508 may correspond to any combination of processor-related circuitry on the respective UEs, including controller/processor 359, transceivers 352 . . . 354, memory 360, etc., of UE 350 of FIG. 3A.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of operating a user equipment (UE), comprising:
   determining a timing for a serving cell;
   obtaining a location of a non-serving cell;
   determining a location of the UE; and
   estimating a timing for the non-serving cell based at least in part on the timing for the serving cell, the location of the non-serving cell and the location of the UE.

2. The method of claim 1, further comprising:
   performing a UE-based positioning procedure,
   wherein positioning assistance information obtained is received at the UE in association with the UE-based positioning procedure.

3. The method of claim 1, further comprising:
  performing one or more measurements of one or more signals from the non-serving cell based on the estimated timing.
4. The method of claim 1, wherein the one or more signals comprise one or more CSI-RSs for radio resource management (RRM) or beam management.
5. The method of claim 1, further comprising:
  monitoring a downlink channel for CSI-RSs from a non-serving cell;
  determining a timing of the non-serving cell based on the CSI-RSs detected by the monitoring;
  ceasing the monitoring of the downlink channel for CSI-RSs from the non-serving cell,
  wherein the estimating is performed while the UE ceases the monitoring of the downlink channel for CSI-RSs from the non-serving cell.
6. The method of claim 5, wherein the ceasing is triggered based on the UE not being configured with an associated Synchronization Signal Block (associatedSSB) or failing to detect the associatedSSB.
7. The method of claim 1,
  wherein the location of the UE is determined based on one or more measurements at the UE of one or more signals from the serving cell, or
  wherein the location of the UE is determined based on a plurality of measurements performed at the UE of a plurality of signals from a plurality of cells.
8. The method of claim 1, wherein the estimating includes:
  determining a first propagation delay between the UE and the serving cell;
  determining a second propagation delay between the UE and the non-serving cell,
  wherein the estimating estimates the timing for the non-serving cell by adding a difference between the first and second propagation delays to the timing for the serving cell.
9. The method of claim 1, wherein the location of the non-serving cell is determined via a radio resource control (RRC) configuration message received from the serving cell that indicates a mapping between a set of cell identifiers and a corresponding set of physical locations.
10. The method of claim 1, wherein the location of the non-serving cell is determined via an LTE Positioning Protocol (LPP) configuration that indicates a mapping between a set of cell identifiers and a corresponding set of physical locations.
11. The method of claim 1, wherein the location of the non-serving cell is obtained based on a message received from the serving cell which indicates an explicit association between a positioning reference signal (PRS) resource configured in accordance with LTE Positioning Protocol (LPP) and a radio resource management (RRM) resource configured in accordance with radio resource control (RRC).
12. The method of claim 11, wherein the message is signaled via LLP or RRC.
13. The method of claim 1, wherein the location of the non-serving cell is obtained based on an implicit association between a positioning reference signal (PRS) resource configured in accordance with LTE Positioning Protocol (LPP) and a radio resource management (RRM) resource configured in accordance with radio resource control (RRC).
14. The method of claim 13,
  wherein the PRS resource is associated with a physical location,
  wherein the PRS resource is implicitly associated with the RRM resource based on each respective resource being configured with the same scrambling code,
  wherein the RRM resource that is implicitly associated with the PRS resource is associated with the same physical location as the PRS resource.
15. A user equipment (UE), comprising:
  a memory;
  at least one transceiver; and
  at least one processor communicatively coupled to the memory and the at least one transceiver and configured to:
    determine a timing for a serving cell;
    obtain a location of a non-serving cell;
    determine a location of the UE; and
    estimate a timing for the non-serving cell based at least in part on the timing for the serving cell, the location of the non-serving cell and the location of the UE.
16. The UE of claim 15,
  wherein the at least one processor is further configured to perform a UE-based positioning procedure,
  wherein positioning assistance information indicative of the location of the non-serving cell is received at the UE in association with the UE-based positioning procedure.
17. The UE of claim 15, wherein the at least one processor is further configured to perform one or more measurements of one or more signals from the non-serving cell based on the estimated timing.
18. The UE of claim 15, wherein the one or more signals comprise one or more CSI-RSs for radio resource management (RRM) or beam management.
19. The UE of claim 15, wherein the at least one processor is further configured to:
  monitor a downlink channel for CSI-RSs from a non-serving cell;
  determine a timing of the non-serving cell based on the CSI-RSs detected by the monitoring;
  cease the monitoring of the downlink channel for CSI-RSs from the non-serving cell,
  wherein the at least one processor is further configured to estimate the timing while the UE ceases the monitoring of the downlink channel for CSI-RSs from the non-serving cell.
20. The UE of claim 19, wherein the ceasing is triggered based on the UE not being configured with an associated Synchronization Signal Block (associatedSSB) or failing to detect the associatedSSB.
21. The UE of claim 15,
  wherein the location of the UE is determined based on one or more measurements at the UE of one or more signals from the serving cell, or
  wherein the location of the UE is determined based on a plurality of measurements performed at the UE of a plurality of signals from a plurality of cells.
22. The UE of claim 15, wherein the wherein the at least one processor is further configured to estimate the timing by:
  determining a first propagation delay between the UE and the serving cell;
  determining a second propagation delay between the UE and the non-serving cell; and
  adding a difference between the first and second propagation delays to the timing for the serving cell.
23. The UE of claim 15, wherein the location of the non-serving cell is obtained via a radio resource control (RRC) configuration message received from the serving cell that indicates a mapping between a set of cell identifiers and a corresponding set of physical locations.

24. The UE of claim 15, wherein the location of the non-serving cell is obtained via an LTE Positioning Protocol (LPP) configuration that indicates a mapping between a set of cell identifiers and a corresponding set of physical locations.

25. The UE of claim 15, wherein the location of the non-serving cell is obtained based on a message received from the serving cell which indicates an explicit association between a positioning reference signal (PRS) resource configured in accordance with LTE Positioning Protocol (LPP) and a radio resource management (RRM) resource configured in accordance with radio resource control (RRC).

26. The UE of claim 25, wherein the message is signaled via LLP or RRC.

27. The UE of claim 25, wherein the location of the non-serving cell is obtained based on an implicit association between a positioning reference signal (PRS) resource configured in accordance with LTE Positioning Protocol (LPP) and a radio resource management (RRM) resource configured in accordance with radio resource control (RRC).

28. The UE of claim 27,
wherein the PRS resource is associated with a physical location,
wherein the PRS resource is implicitly associated with the RRM resource based on each respective resource being configured with the same scrambling code,
wherein the RRM resource that is implicitly associated with the PRS resource is associated with the same physical location as the PRS resource.

29. A user equipment (UE), comprising:
means for determining a timing for a serving cell;
means for obtaining a location of a non-serving cell;
means for determining a location of the UE; and
means for estimating a timing for the non-serving cell based at least in part on the timing for the serving cell, the location of the non-serving cell and the location of the UE.

30. The UE of claim 29, further comprising:
means for performing a UE-based positioning procedure,
wherein positioning assistance information indicative of the location of the non-serving cell is received at the UE in association with the UE-based positioning procedure.

31. The UE of claim 29, further comprising:
means for performing one or more measurements of one or more signals from the non-serving cell based on the estimated timing.

32. The UE of claim 29, wherein the one or more signals comprise one or more CSI-RSs for radio resource management (RRM) or beam management.

33. The UE of claim 32, further comprising:
means for monitoring a downlink channel for CSI-RSs from a non-serving cell;
means for determining a timing of the non-serving cell based on the CSI-RSs detected by the monitoring;
means for ceasing the monitoring of the downlink channel for CSI-RSs from the non-serving cell,
wherein the means for estimating performs the estimation while the UE ceases the monitoring of the downlink channel for CSI-RSs from the non-serving cell.

34. The UE of claim 33, wherein the ceasing is triggered based on the UE not being configured with an associated Synchronization Signal Block (associatedSSB) or failing to detect the associatedSSB.

35. The UE of claim 29,
wherein the location of the UE is determined based on one or more measurements at the UE of one or more signals from the serving cell, or
wherein the location of the UE is determined based on a plurality of measurements performed at the UE of a plurality of signals from a plurality of cells.

36. The UE of claim 29, wherein the means for estimating includes:
means for determining a first propagation delay between the UE and the serving cell;
means for determining a second propagation delay between the UE and the non-serving cell,
wherein the means for estimating estimates the timing for the non-serving cell by adding a difference between the first and second propagation delays to the timing for the serving cell.

37. The UE of claim 29, wherein the location of the non-serving cell is obtained via a radio resource control (RRC) configuration message received from the serving cell that indicates a mapping between a set of cell identifiers and a corresponding set of physical locations.

38. The UE of claim 29, wherein the location of the non-serving cell is obtained via an LTE Positioning Protocol (LPP) configuration that indicates a mapping between a set of cell identifiers and a corresponding set of physical locations.

39. The UE of claim 29, wherein the location of the non-serving cell is obtained based on a message received from the serving cell which indicates an explicit association between a positioning reference signal (PRS) resource configured in accordance with LTE Positioning Protocol (LPP) and a radio resource management (RRM) resource configured in accordance with radio resource control (RRC).

40. The UE of claim 39, wherein the message is signaled via LLP or RRC.

41. The UE of claim 29, wherein the location of the non-serving cell is obtained based on an implicit association between a positioning reference signal (PRS) resource configured in accordance with LTE Positioning Protocol (LPP) and a radio resource management (RRM) resource configured in accordance with radio resource control (RRC).

42. The UE of claim 41,
wherein the PRS resource is associated with a physical location,
wherein the PRS resource is implicitly associated with the RRM resource based on each respective resource being configured with the same scrambling code,
wherein the RRM resource that is implicitly associated with the PRS resource is associated with the same physical location as the PRS resource.

43. A non-transitory computer-readable medium containing instructions stored thereon, which, when executed by a user equipment (UE), cause the UE to perform actions, the instructions comprising:
at least one instruction to cause the UE to determine a timing for a serving cell;
at least one instruction to cause the UE to obtain a location of a non-serving cell;
at least one instruction to cause the UE to determine a location of the UE; and
at least one instruction to cause the UE to estimate a timing for the non-serving cell based at least in part on the timing for the serving cell, the location of the non-serving cell and the location of the UE.

44. The non-transitory computer-readable medium of claim 43, further comprising:

at least one instruction to cause the UE to perform a UE-based positioning procedure, wherein positioning assistance information indicative of the location of the non-serving cell is received at the UE in association with the UE-based positioning procedure.

45. The non-transitory computer-readable medium of claim 43, further comprising:

at least one instruction to cause the UE to perform one or more measurements of one or more signals from the non-serving cell based on the estimated timing.

46. The non-transitory computer-readable medium of claim 43, wherein the one or more signals comprise one or more CSI-RSs for radio resource management (RRM) or beam management.

47. The non-transitory computer-readable medium of claim 43, further comprising:

at least one instruction to cause the UE to monitor a downlink channel for CSI-RSs from a non-serving cell;

at least one instruction to cause the UE to determine a timing of the non-serving cell based on the CSI-RSs detected by the monitoring;

at least one instruction to cause the UE to cease the monitoring of the downlink channel for CSI-RSs from the non-serving cell, wherein the at least one instruction to cause the UE to estimate causes the UE to estimate the timing while the UE ceases the monitoring of the downlink channel for CSI-RSs from the non-serving cell.

* * * * *